United States Patent [19]
Jones

[11] 3,938,432
[45] Feb. 17, 1976

[54] APPARATUS FOR FORMING A PLURALITY OF BALES INTO A STACK OF PREDETERMINED SIZE

[76] Inventor: Richard William Jones, Newhouse Farm, Saint Michaels, Tenbury Wells, Worcestershire, England

[22] Filed: Apr. 29, 1974

[21] Appl. No.: 465,338

[52] U.S. Cl. .................. 100/7; 214/6 B; 214/6 BA
[51] Int. Cl.² .................. B65B 13/02; B65G 57/30
[58] Field of Search .............. 100/7, 8, 17; 214/6 B, 214/6 BA

[56] References Cited
UNITED STATES PATENTS

| | | | |
|---|---|---|---|
| 3,159,287 | 12/1964 | Stroup | 214/6 B |
| 3,278,049 | 10/1966 | Hollyday | 214/6 B |
| 3,278,050 | 10/1966 | Tarbox | 214/6 BA |
| 3,490,613 | 1/1970 | Eggenmuller et al. | 214/6 B |
| 3,510,013 | 5/1970 | Best | 214/6 B |
| 3,563,162 | 2/1971 | Monroe | 100/7 |
| 3,726,210 | 4/1973 | Hawkins | 100/7 |
| 3,807,579 | 4/1974 | Havens | 214/6 B |

FOREIGN PATENTS OR APPLICATIONS

| | | | |
|---|---|---|---|
| 868,753 | 4/1971 | Canada | 214/6 B |

Primary Examiner—Richard E. Aegerter
Assistant Examiner—Richard R. Stearns
Attorney, Agent, or Firm—Kane, Dalsimer, Kane, Sullivan and Kurucz

[57] ABSTRACT

An apparatus for forming a stack of bales of predetermined size in which bales received singly from a baling machine are successively raised as each bale is received to form a vertical row, which, after attaining a predetermined height is moved laterally onto a slideway, said stack being formed by drawing a tying element around a predetermined number of rows after such number of rows has arrived on said slideway.

9 Claims, 4 Drawing Figures

APPARATUS FOR FORMING A PLURALITY OF BALES INTO A STACK OF PREDETERMINED SIZE

This invention relates to apparatus for forming a plurality of bales into a stack of predetermined size.

The object of the invention is to provide convenient apparatus whereby a plurality of bales being delivered from an agricultural baling machine can be formed into, and secured together in a stack of predetermined size which can be handled by known machine.

Apparatus according to the invention comprises in combination a support for receiving successive bales singly from a baling machine, means for raising said support each time a bale is received thereby, catch means for retaining a bale in the position to which it is raised by the support until it is raised further by a succeeding bale being raised by the support, means for moving laterally onto a slideway a vertical row of bales resulting from the raising of a predetermined number of bales by the support, means for drawing a cord, or wire around the rows and for securing the cord, or wire around a predetermined number of rows to form a stack after said predetermined number of rows have been moved into the slideway.

Figure 1:
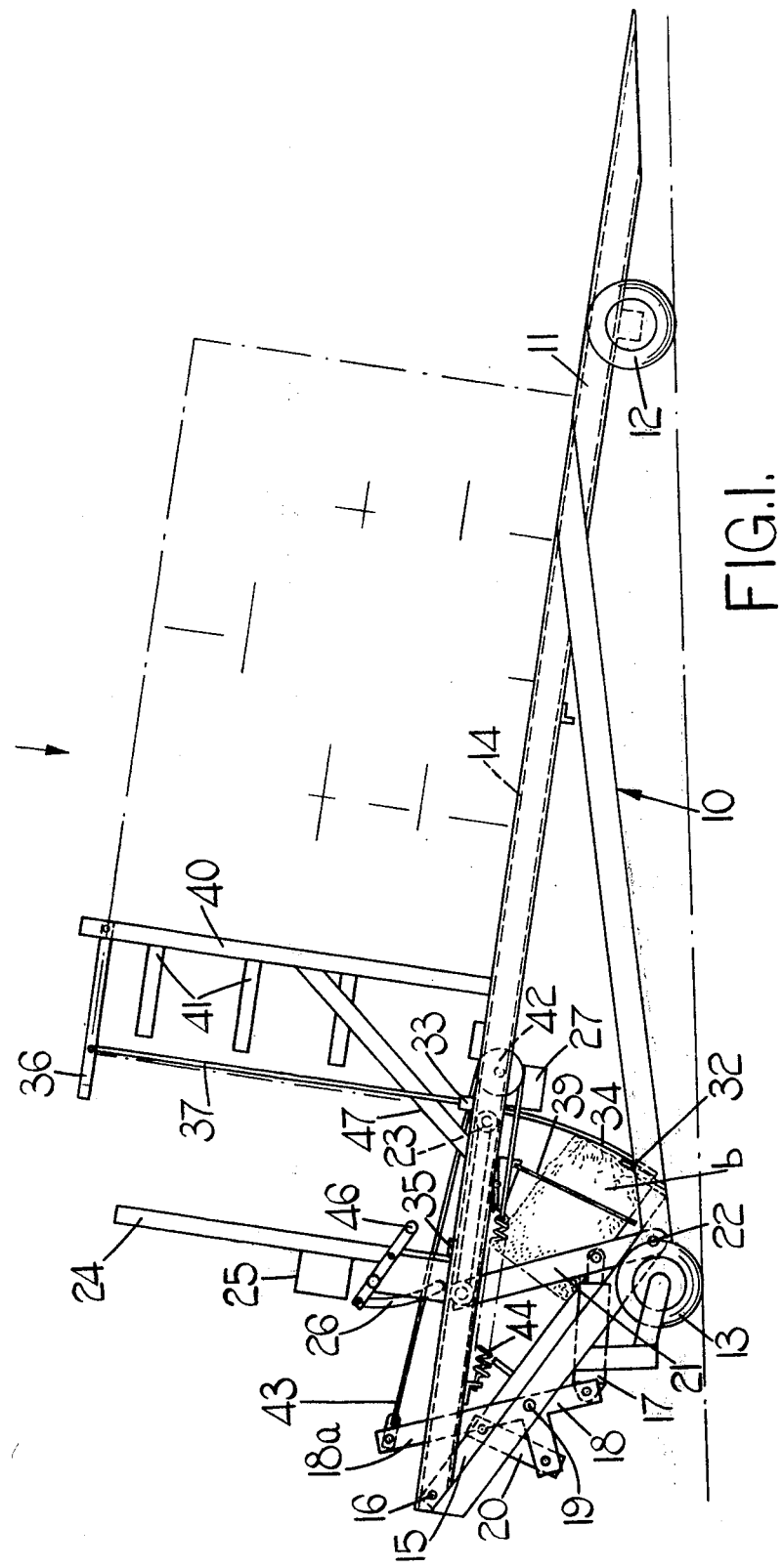
FIG. 1 is a side view of an example of the invention.

In the illustrated example the apparatus is shown in the form of a trailer vehicle which is adapted to be connected behind a conventional agricultural baling machine. However, it will be understood that the apparatus could be built into one vehicle to form part of the baling machine.

Referring to the drawings, there is provided a triangulated frame 10 including a pair of parallel channel section side members 11 having their channels presented to one another and each inclined downwardly from the front of the vehicle to the rear so that their rear lower ends are close to the ground. The rear end of the frame 10 is supported by a pair of wheels 12 whilst the front end is supported by a pair of castor wheels 13 so that the front end of the vehicle can follow closely behind a baling machine.

Extending longitudinally and parallel to the members 11, are a pair of strip metal members 14 which constitute a slideway for the stack of bales as will be described. Moreover, at the forward end of the frame is an angularly movable platform 15 which is pivotally mounted on the frame at 16. The platform 15 can be moved from the position shown in FIG. 1 to the position shown in FIGS. 3 and 4 by means of a double-acting piston and cylinder unit 17 which is intended to receive motive fluid from the hydraulic system of a tractor vehicle towing both the baling machine and the apparatus being described. One end of the unit 17 is pivotally connected to a bellcrank lever 18 pivoted at 19 on the frame 10 and pivotally connected at its opposite end to a link 20 connected to the platform 15. The other end of the unit 17 is pivotally connected to an arm 21 which is pivoted on the frame 10 at 22 and at its opposite end has a pin and slot or equivalent connection with a carriage 23 slidable longitudinally of the vehicle within the channels of the members 11. On the carriage 23 is an upstanding pusher plate 24 which carries a known form of string boxes 25 and a pair of associated hollow needles 26. Moreover, on the frame 10 is an agricultural knotter mechanism 27 of known type, within which the ends of the strings are retained.

Figure 2:
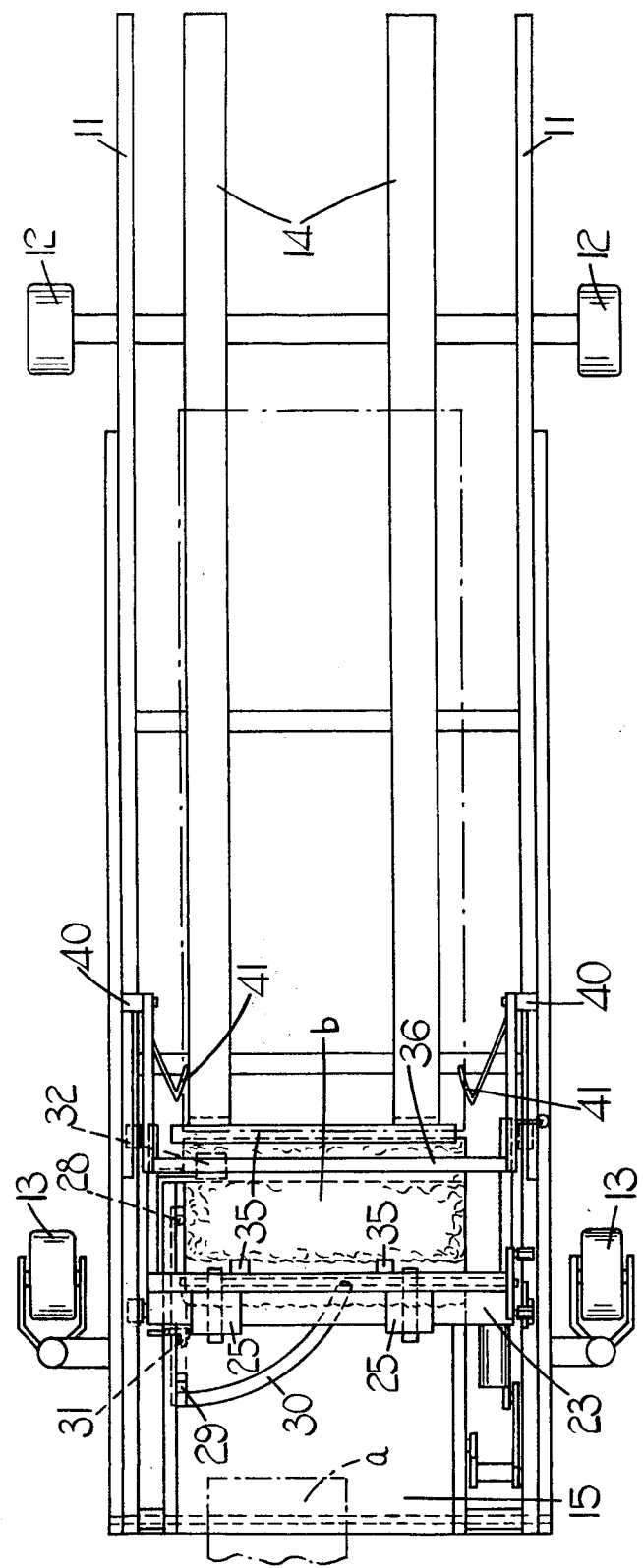
FIG. 2 is a plan view of the example seen in FIG. 1 looking in the direction of the arrow shown in the latter Figure and, FIGS. 3 and 4 respectively are fragmentary side views showing the apparatus in different stages during the forming of the stack.

At one side of the platform 15 is a spring-loaded arm which is pivoted at 28 and has an upstanding end portion 29 which extends through an arcuate slot 30 in the platform 15 when the latter is in its lowered position seen in FIG. 1. The arm is held in the position shown in FIG. 2 against the action of its spring (not shown) by means of a catch 31 which is releasable by means of a latch 32 which is arranged to be struck by a bale as it slides down the platform 15 from the baling machine which delivers it in the approximate position shown in chain dotted lines at *a* in FIG. 2. Release of the catch 31 will allow the spring to cause the part 29 to move through the slot 30 and thereby turn the bale so as to be disposed transversely of the tractor as shown at *b* in FIG. 2. Actuation of the catch 31 also actuates a valve to direct hydraulic fluid to the unit 17 so as to extend the unit. At this stage, a catch 33 retains the carriage 23 from movement so that the bellcrank lever 18 will rock to raise the platform 15 to the positions shown in FIG. 3 thereby moving the bale shown at *b* in contact with a guide plate 34 into the position of the bale shown at *c* in FIG. 3. As the bale moves into this position, it passes pivotal detents 35 which serve to hold the bale in the position *c* after the platform 15 is returned to the position shown in FIG. 1. As the platform moves to the position shown in FIG. 3, it comes into contact with the underside of the carriage 23 which prevents its further movement so that the pressure in the unit 17 builds up to a value such that a valve is actuated to reverse movement of the unit.

The ends of the strings come from rolls in the string boxes 25 and are retained in the knotter 27 so that as the bale moves into the position shown at *c*, the strings will be drawn from the boxes 25 to pass over the bale. Extension of the unit 17 to raise a bale to the position shown in FIG. 3 also effects resetting of the part 29 against the action of its spring.

Figure 3:
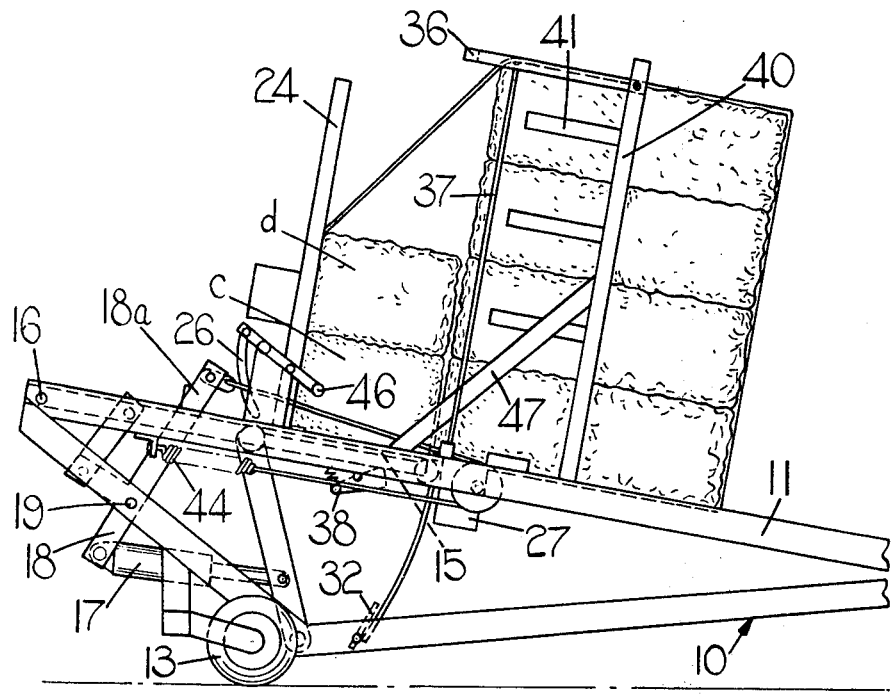
Figure 4:
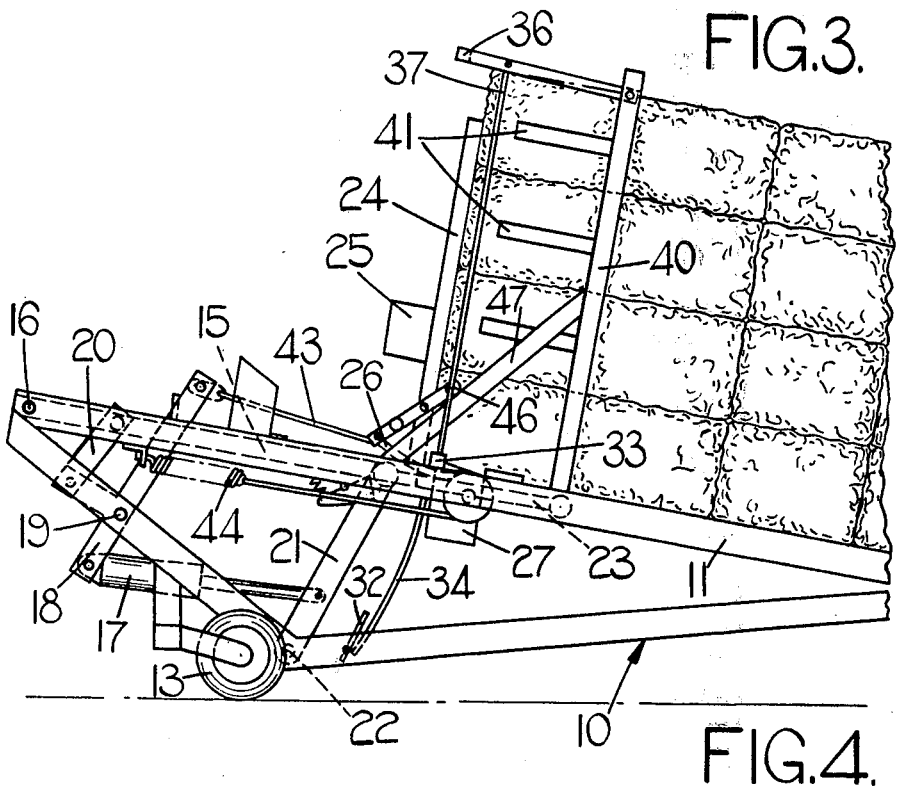

When the next bale is received by the platform 15 the cycle is repeated so that a bale initially at the position *c* in FIG. 3 will be raised to the position shown at *d* by the succeeding bale moving into the position *c*. This cycle is repeated until a vertical row of bales of predetermined number which, in the example shown is 4, are disposed upon the detents 35 on the carriage 23. As the fourth bale is fed into the position *c* to complete its vertical row of bales, the uppermost bale will lift an arm 36 and thereby through the link 37 withdraw the catch 33. As a result, the pressure in the unit 17 will not build up to a value sufficient to reverse its movement and will continue to extend, thereby moving the carriage 23 to the position shown in FIG. 4, thereby moving the vertical row of bales upon the carriage laterally onto the slideway 14. When the unit 17 is fully extended the pressure will again build up to a value sufficient to reverse the valve to reverse the direction of movement of the unit. In the position of FIG. 4 a spring-loaded latch 38 retains the carriage from returning. As a result, the first retraction of the unit 17 effects the lowering of the platform 15 to the position shown in FIG. 1, at which stage the latch 38 is released by a cable 39 to allow continued retraction of the unit 17 to return the carriage to the position of FIG. 1.

At opposite sides of the slideway 14 are upstanding posts 40 carrying the arm 36 and also spring teeth 41 which serve to hold the row of bales from tilting forwardly under the tension of the strings as the carriage 23 returns to the position shown in FIG. 1.

The cycle is repeated until a predetermined number (five in the example shown), of vertical rows of bales have been moved laterally in a rearward direction onto the slideway 14. Associated with the knotter 27 is a counter which enables the knotter to actuate after the five rows have been moved onto the slideway. This knotter is a known form of agricultural knotter and is actuated by a pulley 42 which is driven by a cord 43 interconnecting an extension 18a of the bellcrank lever 18 with a spring 44. In order to enable the knotter to work the usual form of hollow needles 26 through which the strings pass are moved into the knotter 27 by the action of rollers 46 moving up inclined stays 47 as the carriage 23 moves to the position shown in FIG. 4. It is to be understood that the needles 26 will move into a position to permit knotting each time the carriage is moved to the position shown in FIG. 4 but the knotting operation will only be effected after five rows have been moved onto the slideway due to the counter associated with the knotter.

It will be understood that after the knotting operation there is upon the slideway five vertical rows of bales which are secured together to form a stack and this stack will be moved rearwardly by the subsequent movement of successive rows until the stack is deposited on the ground from the rear end of the slideway 14.

It is to be appreciated that the cords and knotting devices can if desired be replaced by wires and twisting devices of known kind.

I claim:

1. Apparatus for forming a quantity of bales into a stack of predetermined size comprising in combination a support, a slideway on the support, a bale receiving platform pivotally mounted on the support between a raised bale discharge position in alignment with the slideway and a position in alignment with a baling machine for receiving a bale therefrom means for automatically raising said bale receiving platform to the bale discharge position each time a bale is received thereby, catch means on the support in position to engage the bale at the bale discharge position for retaining a bale in the position to which it is raised by the bale receiving platform into engagement therewith until it is raised further by a successive bale being raised by the bale receiving platform, means for automatically lowering the platform after the bale is engaged by the catch means for receiving a further bale, means for automatically moving laterally onto the slideway at least one vertical row of bales in response to the raising of a predetermined number of bales by the bale receiving platform and to permit further vertical rows of bales to be formed by the bale receiving platform, means for automatically drawing a binding element in response to the completion of a predetermined number of vertical rows and for automatically securing the binding element around the predetermined number of rows to form a stack after said predetermined number of rows have been moved onto the slideway.

2. Apparatus in accordance with claim 1 wherein the means for raising the support includes a fluid actuated piston and cylinder unit which also is included in the means for moving a vertical row of bales laterally.

3. Apparatus in accordance with claim 2 wherein there are means for mechanically linking one end of the unit to the bale receiving platform and there are means for linking the other end of the unit to a carriage slidably mounted on said support upon which said catch means are mounted.

4. Apparatus in accordance with claim 1 wherein the lateral movement of a vertical row of bales is a movement rearwardly relative to the intended direction of travel of the apparatus and wherein the slideway inclines downwardly toward the rear of the apparatus to a position adjacent the ground.

5. Apparatus in accordance with claim 1 wherein the means for automatically raising said receiving platform provides angular movement of the bale receiving platform about an axis near the front of the apparatus.

6. Apparatus in accordance with claim 1 wherein there are means for turning the bale upon the bale receiving platform through an angle to ensure that it lies in the desired alignment with respect to the apparatus prior to being lifted.

7. Apparatus in accordance with claim 1 wherein the means for drawing and securing the binding elements includes means for retaining a bulk supply of binding element carried by said means for moving laterally to a slideway a vertical row of bales and securing means on the support retaining an end of said binding element at a location with respect to the vertical rows to secure the binding element to the bales.

8. Apparatus in accordance with claim 7 wherein said means for automatically drawing a binding element includes a counter interconnected with the securing means to actuate the securing means after a predetermined number of vertical rows of bales have been moved laterally.

9. Apparatus in accordance with claim 1 in the form of a trailer vehicle with four ground wheels rotatably mounted on the support and the leading pair of which are castor wheels.

* * * * *